United States Patent Office 2,938,017
Patented May 24, 1960

2,938,017

INSOLUBLE POLYMERS OF VINYL PYRROLIDONE AND PROCESS FOR PRODUCING SAME

Frederick Grosser, North Plainfield, N.J., assignor to General Aniline & Film Corporation, New York, N.Y., a corporation of Delaware No Drawing. Filed Oct. 26, 1956, Ser. No. 618,455

8 Claims. (Cl. 260—88.3)

This invention relates to insoluble polymers of N-vinyl pyrrolidone.

I have discovered that N-vinyl-$\alpha$-pyrrolidone can be polymerized to a resin, which is completely insoluble in water, strong mineral acids, caustic solutions, and common organic solvents, by heating monomeric N-vinyl-$\alpha$-pyrrolidone, in the presence of a small amount of an alkali metal or alkaline earth metal; or the oxides or hydroxides or alkoxides of these metals.

The production of soluble polymeric materials from N-vinyl pyrrolidone is well known in the art, having been described, for example in U.S. Patent No. 2,265,450, to Reppe et al., and U.S. Patent No. 2,335,454, to Schuster et al. In these prior art processes for polymerization of N-vinyl pyrrolidone, the N-vinyl pyrrolidone has been polymerized in bulk, or in solution, using peroxides, ultraviolet light, heat, azo compounds, etc., as catalysts, to form polymers of varying molecular weight. However, all of the polymers of N-vinyl pyrrolidone, produced by these prior art processes are quite soluble in water, and many common organic solvents, such as alcohols, ketones, chlorinated hydrocarbons, lactones, tetrahydrofurane, and pyridine.

I have now found that insoluble polymers may be prepared from N-vinyl pyrrolidone, by heating monomeric N-vinyl pyrrolidone in the presence of a small amount of alkali metal, or alkaline earth metal, or the oxides, hydroxides, or alkoxides of these metals. The polymer thus formed is a white, to nearly white, powder; which is insoluble in water, strong mineral acids, caustic solutions, and common organic solvents. It has excellent thermal insulation properties, and is suitable as an insulation material. Shaped articles can be produced from it by compression molding techniques, and the polymer is able to stand relatively high temperatures; e.g., at least about 300° C.

The details of the present invention will be apparent to those skilled in the art from a consideration of the following specific examples:

*Example I*

200 g. N-vinylpyrrolidone. 2 g. sodium hydroxide flakes were heated in a distilling flask at 100 mm. under total reflux for about 3 hours. At this time the temperature rose from 145–146° C. to 190° C. and the refluxing monomer was converted to a white solid. After cooling, the polymer was slurried with water to wash out caustic and unconverted monomer, filtered, and dried at 50–60° C. in vacuo.

*Example II*

20,000 g. N-vinylpyrrolidone. 20 g. sodium hydroxide flakes were heated in a distilling flask at 100 mm. under reflux for about 3 hours. At this time the temperature rose from 150° to 190° C. and the refluxing monomer was converted to a white solid. After cooling, the polymer was slurried in water to wash out caustic and residual monomer, filtered, and dried.

*Example III*

300 g. N-vinylpyrrolidone. 3 g. sodium methylate were heated in a distilling flask at 100 mm. under reflux for about 3 hours. At this time the temperature rose to about 185° C. and the refluxing monomer was converted to a white solid. After cooling, the polymer was washed with water, filtered and dried.

*Example IV*

100 g. N-vinylpyrrolidone. 4 g. sodium methylate were heated in a distilling flask at 100 mm. under reflux for about one-half hour. At this time the temperature rose from 150–183° C. and the refluxing monomer was converted to a white solid. After cooling, the polymer was washed with water, filtered and dried.

*Example V*

100 g. N-vinylpyrrolidone. 4 g. potassum hydroxide pellets were heated in a distilling flask at 100 mm. under reflux for about 13 hours. At this time the temperature rose from 150–190° C. and the refluxing monomer was converted to a white solid. After cooling, the polymer was washed with water, filtered, and dried.

The polymers obtained in the foregoing examples were found to be insoluble in water, strong mineral acids; (e.g., sulfuric acid, hydrochloric acid, phosphoric acid (85%) and nitric acid (36%)), caustic solutions and all organic solvents in which they were tested; e.g., glacial acetic acid, methanol, ethanol, acetone, chloroform, butyrolactone, tetrahydrofurane, ethylacetate, xylene and pyridine; diethyl ether, petroleum ether, carbon tetrachloride, dichloroethane, methylethyl ketone, kerosene, dibutyl phthalate, triethylene glycol, trichloroethylene, triethanolamine, pyrrolidone, propargyl alcohol, nonylphenol, vinyl isobutyl ether, dioxane, dimethyl chloroacetal, and $\alpha$-(chloromethoxy)-ethylbenzene. They had good thermal insulation properties, and no evidence of decomposition was evident on heating to 300° C. Shaped articles could be produced from them by compression molding technique, either alone, or in admixture with other thermo-plastic and thermo-setting synthetic resins.

It will be understood that the foregoing examples are an illustration of the prepared embodiment of the present invention, but that various modifications, which will suggest themselves to those skilled in the art, may be made therein.

Thus, the amount of catalyst employed (alkali metal, or alkaline earth metal, or the oxides, hydroxides, or alkoxides thereof), is preferably, about 1% by weight of the monomer. However, somewhat less catalyst, e.g., 0.1% may be used, and greater amounts, e.g., at least 5% by weight, are also operative, but do not appear to be necessary.

In place of sodium, or potassium, hydroxide, or sodium methylate used as a catalyst in the above examples, there may be used the alkali metals, such as sodium, potassium and lithium, or the oxides and hydroxides of the alkali metals; or the alkoxides, such as sodium methylate or ethylate. In addition, the alkaline earth metals, such as calcium and barium, and, preferably, their oxides and hydroxides, may be used as catalyst. If desired, polymerization may be effected in the presence of inert organic solvents, and the most suitable temperature range appears to be from about 40° C., to 200° C.

The exact mechanism of the polymerization is not understood, and, due to the relative insolubility of the polymer produced, little is known of its chemical structure.

I claim:

1. A method of polymerizing N-vinyl-$\alpha$-pyrrolidone, which comprises heating to a temperature of from about 400° C. to 200° C. N-vinyl-α-pyrrolidone in the presence of a small amount of a catalyst, consisting essentially of a compound selected from the group consisting of alkali metals, alkaline earth metals, and the oxides, hydroxides, and alkoxides of these metals.

2. The polymer produced from N-vinyl-α-pyrrolidone by the process defined in claim 1, said polymer being characterized by its insolubility in water, strong mineral acids, caustic solutions, and common organic solvents.

3. A method of producing polymers from N-vinyl-α-pyrrolidone, which comprises heating to a temperature of from about 40° C. to 200° C. the same in the presence of a small amount of a catalyst consisting essentially of an alkali metal hydroxide.

4. The process as defined in claim 3 wherein the alkali metal hydroxide specified is sodium hydroxide.

5. The process as defined in claim 3 wherein the alkali metal hydroxide specified is potassium hydroxide.

6. The process of producing polymers from N-vinyl-α-pyrrolidone which comprises heating to a temperature of from about 40° C. to 200° C. the same in the presence of a small amount of a catalyst consisting essentially of an alkali metal alkoxide.

7. The process as defined in claim 6, wherein the alkali metal alkoxide specified is sodium methylate.

8. The process as defined in claim 6, wherein the alkali metal alkoxide specified is potassium methylate.

References Cited in the file of this patent
UNITED STATES PATENTS

| | | |
|---|---|---|
| 2,665,271 | Beller | Jan. 5, 1954 |

FOREIGN PATENTS

| | | |
|---|---|---|
| 516,071 | Belgium | June 6, 1953 |